US009617771B2

(12) United States Patent
Gill (10) Patent No.: US 9,617,771 B2
(45) Date of Patent: Apr. 11, 2017

(54) ADJUSTABLE SAFETY PANEL CONNECTOR

(71) Applicant: Bart's Ltd, Harbour (HK)

(72) Inventor: Shane Gill, Beauty Point (AU)

(73) Assignee: Bart's Ltd, Harbour (HK)

( * ) Notice: Subject to any disclaimer, the term of this patent is extended or adjusted under 35 U.S.C. 154(b) by 0 days.

(21) Appl. No.: 14/730,813

(22) Filed: Jun. 4, 2015

(65) Prior Publication Data

US 2015/0267449 A1 Sep. 24, 2015

Related U.S. Application Data

(63) Continuation of application No. PCT/AU2013/001418, filed on Dec. 5, 2013.

(30) Foreign Application Priority Data

Dec. 5, 2012 (AU) ................................ 2012905326

(51) Int. Cl.
| | | |
|---|---|---|
| *E05D 11/10* | (2006.01) | |
| *E04G 5/14* | (2006.01) | |
| | *E04F 11/18* | |
| (2006.01) | *E05D 5/04* | |
| (2006.01) | *F16B 5/06* | |
| (2006.01) | *E05D 7/12* | |
| (2006.01) | *E06B 9/00* | |
| (2006.01) | | |

(52) U.S. Cl.
CPC ...... *E05D 11/1028* (2013.01); *E04F 11/1834* (2013.01); *E04F 11/1855* (2013.01);
(Continued)

(58) Field of Classification Search
CPC ... E05D 7/12; E05D 11/1028; E05D 11/1007; E05D 2011/1035; E05D 5/04; E05D 5/06;
(Continued)

(56) References Cited

U.S. PATENT DOCUMENTS 3,651,851 A * 3/1972 Curtis .................. E04H 17/161
119/514
5,826,380 A 10/1998 Wolfe
(Continued)

FOREIGN PATENT DOCUMENTS

CA 2244568 8/1998
WO WO 2012/142645 10/2012

OTHER PUBLICATIONS

International Application No. PCT/AU2013/001418 International Prelimniary Report on Patentability, May 16, 2014, 4 pgs.
(Continued)

*Primary Examiner* — Blair M Johnson
(74) *Attorney, Agent, or Firm* — Woodard, Emhardt, Moriarty, McNett & Henry LLP (57) ABSTRACT

An adjustable panel connector (100, 300) for interconnecting two mesh panels (105) of a barricade and/or guarding system. The adjustable panel connector (100, 300) comprises a first body element (102, 302) including at least one first panel fastening arrangement (106, 108, 311); a second body element (104, 304) including at least one second panel fastening arrangement (106, 108, 311), the first body element (102, 302) and the second body element (104, 304) being interconnected along and about a connection axis (X-X, Y-Y); and a pivot locking arrangement (110, 301) configured to lock the first body element (102, 302) at a selected angle relative to the second body element (104, 304) about the connection axis (X-X, Y-Y).

25 Claims, 9 Drawing Sheets

(52) U.S. Cl.
CPC ............... *E04G 5/14* (2013.01); *E04G 5/145* (2013.01); *E05D 5/04* (2013.01); *E04G 2005/148* (2013.01); *E05D 2007/126* (2013.01); *E05D 2011/1035* (2013.01); *E06B 2009/002* (2013.01); *F16B 5/0614* (2013.01); *Y10T 16/5345* (2015.01)

(58) Field of Classification Search
CPC .. E06B 9/0638; E06B 9/0623; E04F 11/1834; E04F 11/1855; E04G 2005/148; F16B 5/0614; F16B 5/0628; F16B 5/0635; F16B 5/06; F16B 5/0607; Y10T 16/5345; Y10T 403/32368
USPC .......................................................... 403/97
See application file for complete search history.

(56) References Cited

U.S. PATENT DOCUMENTS

| | | | |
|---|---|---|---|
| 5,901,514 A | 5/1999 | Wolfe | |
| 6,085,469 A | 7/2000 | Wolfe | |
| 6,119,410 A | 9/2000 | Wolfe | |
| 7,389,573 B2 | 6/2008 | Pesta | |
| 7,866,635 B2* | 1/2011 | Payne | E04H 17/161 256/24 |
| 8,099,803 B2 | 1/2012 | Pesta | |
| 8,636,266 B2 | 1/2014 | Gill | |
| 8,925,903 B2 | 1/2015 | Gill | |
| 2008/0141495 A1* | 6/2008 | Fisher | A63H 33/008 16/343 |
| 2013/0032771 A1* | 2/2013 | Gill | E04F 11/1855 256/24 |
| 2014/0124723 A1* | 5/2014 | Gill | E04F 11/1855 256/24 |
| 2015/0225971 A1* | 8/2015 | Gill | F16B 2/08 182/112 |
| 2015/0267449 A1* | 9/2015 | Gill | E04G 5/14 160/382 |

OTHER PUBLICATIONS

International Application No. PCT/AU2013/001418 International Search Report, mailed Jan. 31, 2014, 4 pgs.

* cited by examiner

ADJUSTABLE SAFETY PANEL CONNECTOR

The present application is a continuation of PCT/AU2013/001418, filed Dec. 5, 2013, which claims the benefit of Australian Provisional Patent Application Serial No. 2012905326, filed Dec. 5, 2012, both of which are hereby incorporated by reference in their entireties.

TECHNICAL FIELD

The present invention relates to an adjustable connector for interconnecting safety panels in a safety barricade and/or guarding system. More specifically, the present invention can be used as part of a safety barricade system that is installed around the perimeter of a building or structure, elevated walkways or platforms and used during or after construction in order to prevent objects from falling from the building or structure. The present invention can also be used to interconnect safety panels in guarding applications to protect operators from moving components and other hazards of machinery and equipment, in particular industrial machinery and equipment.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

A number of safety barricade systems have been recently proposed which use connectors, such as clevis type clips and/or clamps, to fix mesh panel barriers over and around gaps between support poles and railings around elevated walkways and platforms, scaffolding, and around industrial machinery. One example is described in the Applicant's international patent application PCT/AU2011/001165.

Mesh panels in these safety barricade systems need to be joined at various angles to complement the angles on the mounting structures that the system is to be attached. In existing systems, individual mesh panels are interconnected using a purpose built joiner assembly. Existing joiner assemblies generally comprise a series of connecting strips which include two parallel aligned side channels configured to receive the respective ends of adjacent mesh panels. The connecting strips are manufactured as unitary bodies set at a fixed angle between the side channels. These joiner assemblies necessitate a number of different connecting strip configurations to be manufactured for any safety barricade or guarding installation in order to accommodate the variety of angles (for example, 30, 45, 60, 90 etc.) required to complement the angles on the mounting structures that the barrier system is to be attached.

It would therefore be desirable to provide an improved and/or alternative panel interconnection arrangement for a barricade, and/or guarding system.

SUMMARY OF THE INVENTION

In a first aspect, there is disclosed an adjustable panel connector for interconnecting two mesh panels of a barricade and/or guarding system, the adjustable panel connector comprising:

a first body element including at least one first panel fastening arrangement;

a second body element including at least one second panel fastening arrangement, the first body element and the second body element being interconnected along and about a connection axis; and a pivot locking arrangement configured to lock the first body element at a selected angle relative to the second body element about the connection axis, wherein at least one of the first panel fastening arrangement or second panel fastening arrangement comprises:

a mesh receiving formation for receiving a section of a mesh panel, and a locking element for securing the section of mesh panel within the mesh receiving formation, the locking element being rotatable between a receiving position in which a first portion of a mesh panel is received within the locking element and a locking position in which the locking element engages around and/or over said portion of the mesh panel.

The present invention provides an adjustable panel connector having a first body element which can be connected to a first mesh panel using a first panel fastening arrangement, and a second body element which can be connected to a second safety panel using a second panel fastening arrangement. The first and the second body elements are interconnected along and about a connection axis. In use, the first body element can be moved to a selected angle relative to the second body element about the connection axis and then locked into that angle using the pivot locking arrangement. The angle adjustment between the first body element and the second body element enables a single connector to be used for connecting adjoining mesh panels together at a large variety of angles. The angle between the body elements can be adjusted to match the required angle between the two mesh panels and then locked into place using the pivot locking arrangement.

The connection between the first and second body elements provided along the connection axis comprises any suitable arrangement. Suitable arrangements include universal connectors, flexible members, hooks, interconnected rings or the like. In an exemplary embodiment, the pivot connection comprises a hinge arrangement. The hinge arrangement preferably includes an elongate connection rod which extends along the connection axis, with each of the first and the second body elements being connected to and about that connection rod.

The pivot locking arrangement can comprise any component capable of locking the first body element at a selected angle relative to the second body element. The locking element preferably extends along or about the connection axis, and interacts with the connection between the first body element and the second body element. The pivot locking arrangement is preferably releasably configured. In a preferred embodiment, the pivot locking arrangement comprises an elongate connection rod receivable within at least one connector element of the first body element and the second body element. The pivot locking arrangement is preferably configured to interlock with the connector element when received therein. Each connector element is preferably located proximate the connection axis at respective adjacent edges of each of the first body element and the second body element. In some embodiments, the connector element comprises at least one connector sleeve configured to receive at least a portion of the connection rod, the connection rod having an interference fit within the connector sleeve(s). The interference fit can be created through any co-operative or complementary interlocking fit between the connection rod and the connector sleeve. The complementary fit prevents rotation of the connector sleeve around the connection rod and therefore locks the connected first body element and the second body element into a selected position once the connection rod is received within the connector sleeve. The connection rod is preferably releasably received within the connector sleeve.

In some embodiments, the connection rod and connector sleeve have a complementary fit, the connection rod including at least one flat surface which interlocks with a complementary flat surface within the connector sleeve. In other embodiments, the connection rod has a polygonal cross-section, preferably a regular polygon, including triangle, square, rectangle, pentagonal, hexagonal, octagonal or the like. The connector sleeve preferably has a complementary shape.

In other embodiments, the connection rod includes at least one longitudinal fin or rib which is received within a complementary shaped groove within each connector sleeve of the first and the second body elements. More preferably, the connection rod includes a plurality of longitudinal fins or ribs annularly spaced apart around the outer surface of the connection rod.

Any number of connector sleeves can be used to receive the connection rod. In some embodiments, each of the first body element and the second body element include at least two spaced apart connector sleeves. The respective connector sleeves of the first body element and the second body element are preferably configured to interlace about and along the connection axis.

The first panel fastening arrangement and the second panel fastening arrangement can have a number of configurations. The first panel fastening arrangement and the second panel fastening arrangement may have the same configuration in a number of embodiments. However, it should be appreciated that other embodiments may utilise different configurations and provide the same panel joining advantages.

At least one of the first panel fastening arrangement or second panel fastening arrangement preferably comprise a mesh receiving formation for receiving a section of a mesh panel and a locking element for securing the section of mesh panel within the mesh receiving formation. The locking element is preferably movable between a receiving position in which a first portion of a mesh panel is received within the locking element and a locking position in which the locking element engages around and/or over said portion of the mesh panel. The locking element is preferably rotatable between the locking position and receiving position. To perform this function, the locking element is preferably rotatably mounted within the mesh receiving formation.

The locking element can comprise any clip, clamp or fastening structure which can be moved to engage and secure, preferably releasably secure, the selected section of the mesh panel within the first mesh receiving channel. In some embodiments, the locking element comprises a generally cylindrical body including an opening configured to receive the selected section of the mesh panel. The locking element may include a handle for manual rotational manipulation of the locking element.

The mesh receiving formation can comprise any formation that can secure the selected section of mesh panel to the respective first body element or the second body element. In some embodiments, the mesh receiving formation includes a first mesh receiving channel which receives a first portion of said section of mesh panel, and a second mesh receiving channel which receives a second portion of said section of mesh panel. The first mesh receiving channel and the second mesh receiving channel are preferably spaced apart. Furthermore, in this embodiment, the locking element is preferably rotatably mounted within at least one of the first mesh receiving channel or the second mesh receiving channel. In this embodiment, the mesh panel is then secured within both the first mesh receiving channel and second mesh receiving channel through the cooperative configuration of the first mesh receiving channel and second mesh receiving channel.

Each of the first mesh receiving channel and the second mesh receiving channel can be configured to receive and seat a selected portion of the mesh panel. The configuration and size of the section of the mesh panel received within the first and the second mesh receiving channel can vary depending on the size of the connector arrangement. In some embodiments, the connector arrangement is sized to fit within an aperture of the grid/lattice of a mesh panel. Here, the first and/or second receiving channel could be configured to receive a longitudinal cross-member of the mesh grid. In other embodiments, the arrangement is sized to fit within and across two or more aperture of the grid/lattice of a mesh panel. In these embodiments, the first and/or second receiving channel could be configured to receive both lateral and longitudinal cross-members of the mesh grid. Each first and/or second mesh receiving channel would therefore preferably include at least one lateral groove for receiving a lateral member of the section of a mesh panel.

The second mesh receiving channel can be configured to receive any appropriate second section of the mesh panel to create two securement positions on the mesh panel. In some embodiments, the second mesh receiving channel is configured to receive an edge portion of the mesh panel. The first mesh receiving channel can then be secured to a section spaced away from the edge of the mesh panel, for example to adjacent mesh cross-members spaced away from the edge by at least one mesh aperture.

In a preferred embodiment, the second mesh receiving channel is formed at or near the connection axis. In some embodiments, the second mesh receiving channel is formed from at least one flange extending from or at the connection axis. The flanges preferably extend from the connector sleeves in those embodiments where each of the first body element and second body elements include connector sleeves.

Any number of first and the second panel fastening arrangements can be respectively provided in the first and the second body elements. In some embodiments, each first body element includes two spaced apart first panel fastening arrangements, and each second body element includes two spaced apart second panel fastening arrangements.

The first and the second body elements can include further panel fastening arrangements. In some embodiments, each of the first body element and the second body element include at least one third panel fastening arrangement. The third panel fastening arrangement preferably has a different configuration to the first and the second panel fastening arrangements.

In some embodiments, at least one of the first panel fastening arrangement, the second panel fastening arrangement or the third panel fastening arrangement includes a joiner engagement formation for a joiner arrangement. The joiner engagement formation may include any number of fastening arrangements, including clips, clamps, hooks, loops, projections or the like. In preferred embodiments, the joiner engagement formation includes at least a first aperture.

In some embodiments, the respective first panel fastening arrangement, second panel fastening arrangement or third panel fastening arrangement includes a joiner arrangement which cooperates with the joiner engagement formation. The joiner arrangement can comprise any fastener, clip, peg, joiner or the like which can be utilised in cooperation with the mounting body to attach another element, such as a panel, to the mounting arrangement. In some embodiments, the joiner arrangement comprises a bolt which screws or is otherwise releasably engaged within the second engagement formation. In one preferred embodiment, the joiner arrangement comprises a joiner element having a first engagement formation located on a first side, and a second engagement formation located on an opposing second side, the first engagement formation being adapted to engage the joiner engagement formation to secure the joiner element to the respective first body element or second body element of the adjustable panel connector. The joiner arrangement also comprises a stopper element having a third engagement formation, the third engagement formation being engageable with the second engagement formation to secure the stopper element to the joiner element.

In some embodiments, the joiner engagement formation is pivotally engaged with the first engagement formation and the second engagement formation is eccentric relative to the first engagement formation. This configuration enables the second engagement formation to rotate around the first engagement formation. This provides an element of adjustability which, in use, facilitates alignment of the second engagement formation with another element, such as an aperture of a mesh panel.

The joiner engagement formation preferably includes a first aperture, and the first engagement formation includes a first projection having a flange adapted to engage with the first aperture. The second engagement formation preferably includes a second projection, having a flange adapted to engage with a second aperture formed in the stopper element.

The stopper element is preferably a generally circular disc and the second aperture is located in a central region of the disc.

The first body element and the second body element can include yet further connector formations for mounting or otherwise connecting each respective body element to a mounting location. In some embodiments, each of the first body element and the second body element include at least one opening through which at least one fastener can be received. The fastener may comprise a bolt, screw, nail, rivet or similar which can be inserted, adhered or otherwise inserted into a mounting body to mount the respective first or second body element onto that mounting location.

In some embodiments, at least one of the first panel fastening arrangement or the second panel fastening arrangement comprises at least one longitudinally extending joiner channel adapted to receive an edge portion of said mesh panel. In some embodiment, each of the first panel fastening arrangement and the second panel fastening arrangement comprise at least one longitudinally extending joiner channel adapted to receive an edge portion of said mesh panel. In some embodiments, the, or each longitudinally extending joiner channel includes angled teeth. The angled teeth can be directed toward a base of the first and second longitudinally extending joiner channels, and presented at an angle such that upon insertion of a mesh panel therein, the angled teeth inhibit removal of said mesh panel. In other embodiments, the joiner assembly includes a series of ribs located in the first and second longitudinally extending joiner channels.

In these embodiments, the first and the second body elements preferably comprise elongate plates, including two longitudinally extending members between which each longitudinally extending joiner channel is located. Some embodiments further include at least one fastening aperture in at least one elongate plate through which a fastener can be received mesh panel positioned within the respective first or second longitudinally extending joiner channels. In some embodiments, a group of fastening apertures are provided in close proximity configured in a pattern. The pattern is preferably designed to provide a variety of fastening locations to allow a user to select the best aligned fastening apertures with a selected aperture of a mesh panel. The pattern can comprise any suitable arrangement, for example, circular, V-shaped, T-shaped, U-shaped, X-shaped, Y-shaped or the like. Typically, a number of fastening apertures would be spaced along the length of the longitudinally extending members to provide a series of fastening locations for a mesh panel Some embodiments of the joiner assembly can include at least one fastener which extends through at least one section of the two longitudinally extending members. In use, the fastener would extend through a section of the edge portion of a mesh panel positioned within the respective first or second longitudinally extending joiner channels. The fastener fixes the mesh panel within the respective longitudinally extending joiner channels. The fastener can comprise a screw, pin, bolt or the like. In a preferred embodiment, the fastener comprises a pin including a series of resilient ribs or ridges sized to releasably engage within an opening located in the respective longitudinally extending members of the joiner assembly.

Some embodiments may include a cap configured to fit over the ends of the longitudinally extending members. The cap may include openings for receiving the fastener. The cap can be releasably fitted to and over the ends of the first panel fastening arrangement or the second panel fastening arrangement using any suitable means. In one embodiment, the cap includes snap fit tabs which are received within complementary channels located in a corresponding face of the longitudinally extending members.

The first and the second body elements can have any suitable configuration. In some embodiments, each of the first body element and the second body element are configured as plates. In some embodiments, the first and the second body elements comprise elongate plates.

It should be understood that the adjustable panel connector may include further body elements, for example a third body element, fourth body element etc. . . . . The further body elements may be interconnected with one of, or each of, the first and second body elements along the connection axis, or in other embodiments along at least one further independent connection axis.

In a second aspect, the present invention provides a barricade and/or guarding system including:
at least two mesh panels, each mesh panel being arranged with at least one edge of a first mesh panel being adjacent to at least one edge of a second mesh panel;
at least one adjustable connector arrangement according to the first aspect of the present invention;
wherein in use, a connector is inserted between the adjacent edges of the first mesh panel and the second mesh panel to interconnect the first mesh panel and the second mesh panel about the adjacent edges.

BRIEF DESCRIPTION OF THE DRAWINGS

A preferred embodiment of the invention will now be described by way of specific examples with reference to the accompanying drawings, in which.

DETAILED DESCRIPTION

FIGS. 1 to 11 illustrate a first embodiment of an adjustable panel connector 100 according to the present invention which can be used to interconnect mesh panels 105 (FIGS. 6 to 11) that form part of a barricade, guarding barricade and/or guarding system or assembly.

Figure 1:
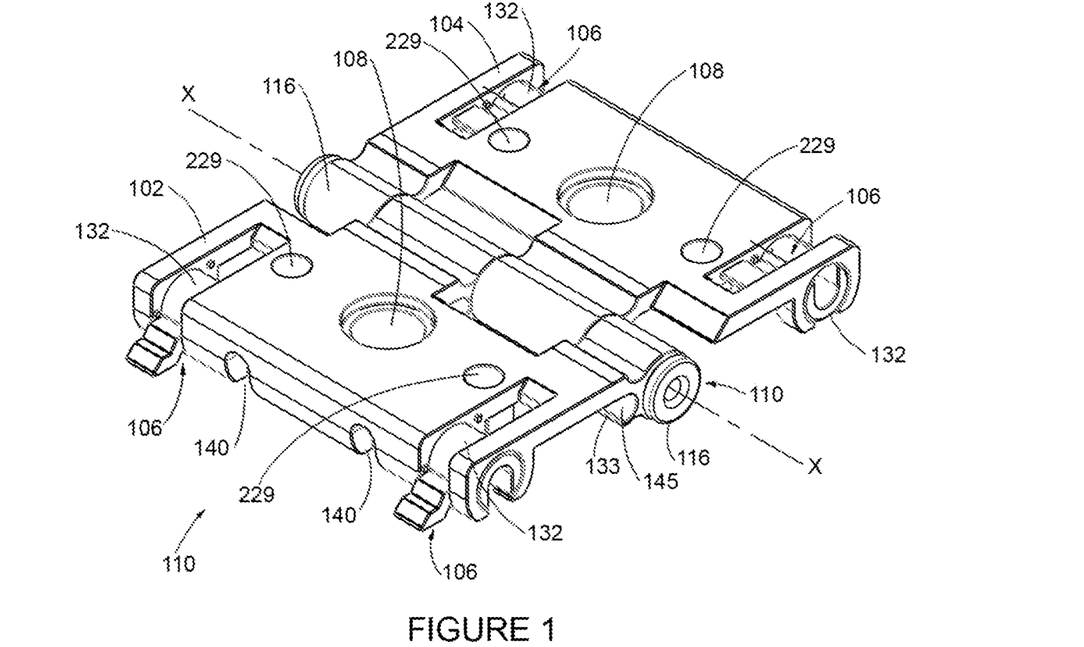
FIG. 1 is a top perspective view of an adjustable panel connector according to a first embodiment of the present invention.
Figure 2:
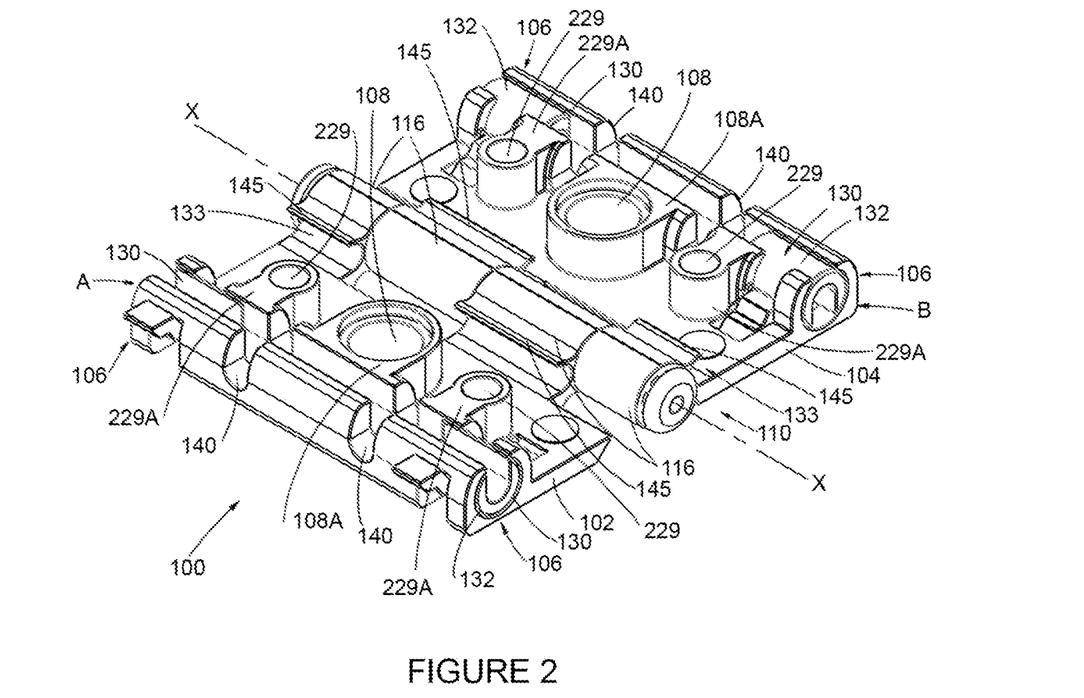
FIG. 2 is a base perspective view of the adjustable panel connector illustrated in FIG. 1.
Figure 3:
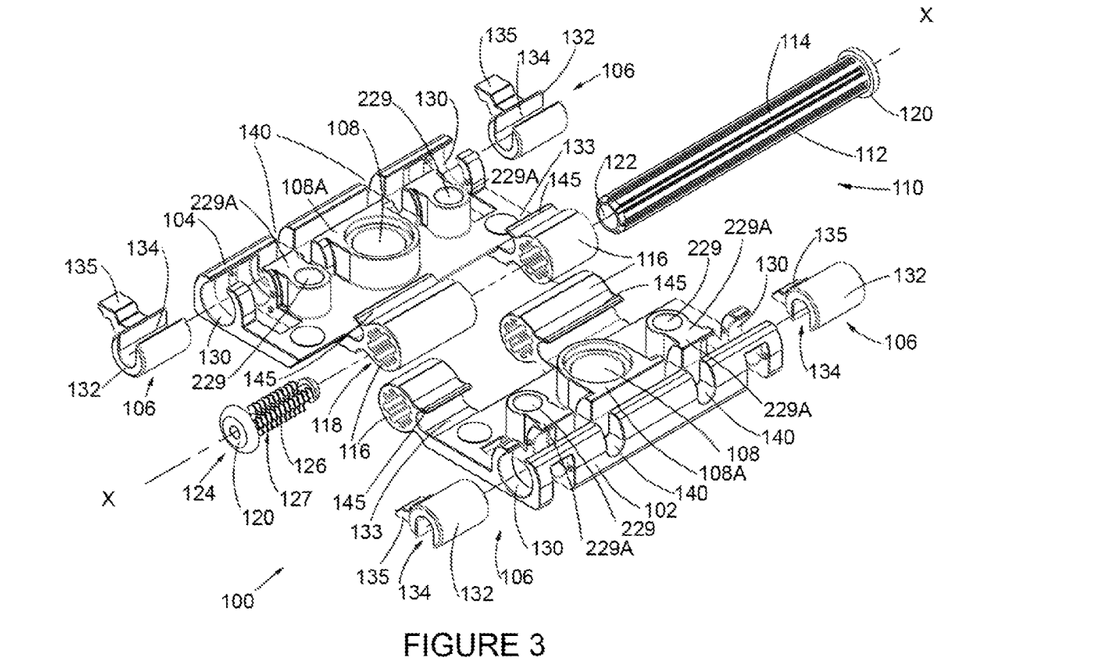
FIG. 3 is an exploded view of the components of the adjustable panel connector shown in FIGS. 1 and 2.

Referring firstly to FIGS. 1 to 3, the illustrated adjustable panel connector 100 generally comprises a first rectangular panel element 102 and a second rectangular panel element 104 interconnected along and about a connection axis X-X. Each of the first panel element 102 and the second panel element 104 include two spaced apart first fastening arrangements 106 configured for direct connection to portions of mesh panel, and a central joiner engagement aperture 108 configured for connection to a joiner arrangement (detailed below). The first panel element 102 and the second panel element 104 are interconnected using a connection arrangement 110 configured to lock the first panel element 102 at a selected angle relative to the second panel element 104 about the axis X-X.

The illustrated pivot connection arrangement 110 comprises a hinge assembly having a pivot locking rod 112 which is received in a series of connector sleeves 116 which form part of each of the first panel element 102 and the second panel element 104. The pivot locking rod 112 comprises an elongate connection rod including a plurality of longitudinal ribs 114 (FIG. 3) extending around the circumference of the rod. Each of the first panel element 102 and the second panel element 104 include two spaced apart connector sleeves 116 aligned with and extending along the axis X-X. The pivot locking rod 112 is releasably received within a respective set of connector sleeves 116. The respective connector sleeves 116 of the first panel element 102 and the second panel element 104 interlace about and along the axis X-X. Each connector sleeve 116 includes an internal channel 118 (FIG. 3) having a complementary fluted configuration to the ribbed pivot locking rod 112. This complementary shape forms an interference fit between the pivot locking rod 112 and the connector sleeves 116, when the pivot locking rod 112 is received within the connector sleeves 116. This fit prevents rotation of the connector sleeves 116 around the pivot locking rod 112, thereby locking the position of the first panel element 102 and the second panel element 104 at a fixed angle relative to the axis X-X.

The illustrated pivot locking rod 114 includes a flanged head 120 at a first end and a aperture 122 at the opposite end configured to receive a plug 124 (FIG. 3) once the pivot locking rod 112 is fitted into the connector sleeves 116. The illustrated plug 124 includes a series of ribs or barbs 126 extending along an elongate shaft 127. The barbs 126 create a tight friction fit within the aperture 122 to hold the plug 124 in place once inserted therein.

The angle between the first panel element 102 and the second panel element 104 can be adjusted to match the required angle between two adjoining mesh panels and then locked into place by inserting the pivot locking rod 112 into the respective connector sleeves 116 of the first panel element 102 and the second panel element 104. This angle adjustment and lock enables a single connector to be used for connecting adjoining mesh panels together at a large variety of angles.

Figure 5:
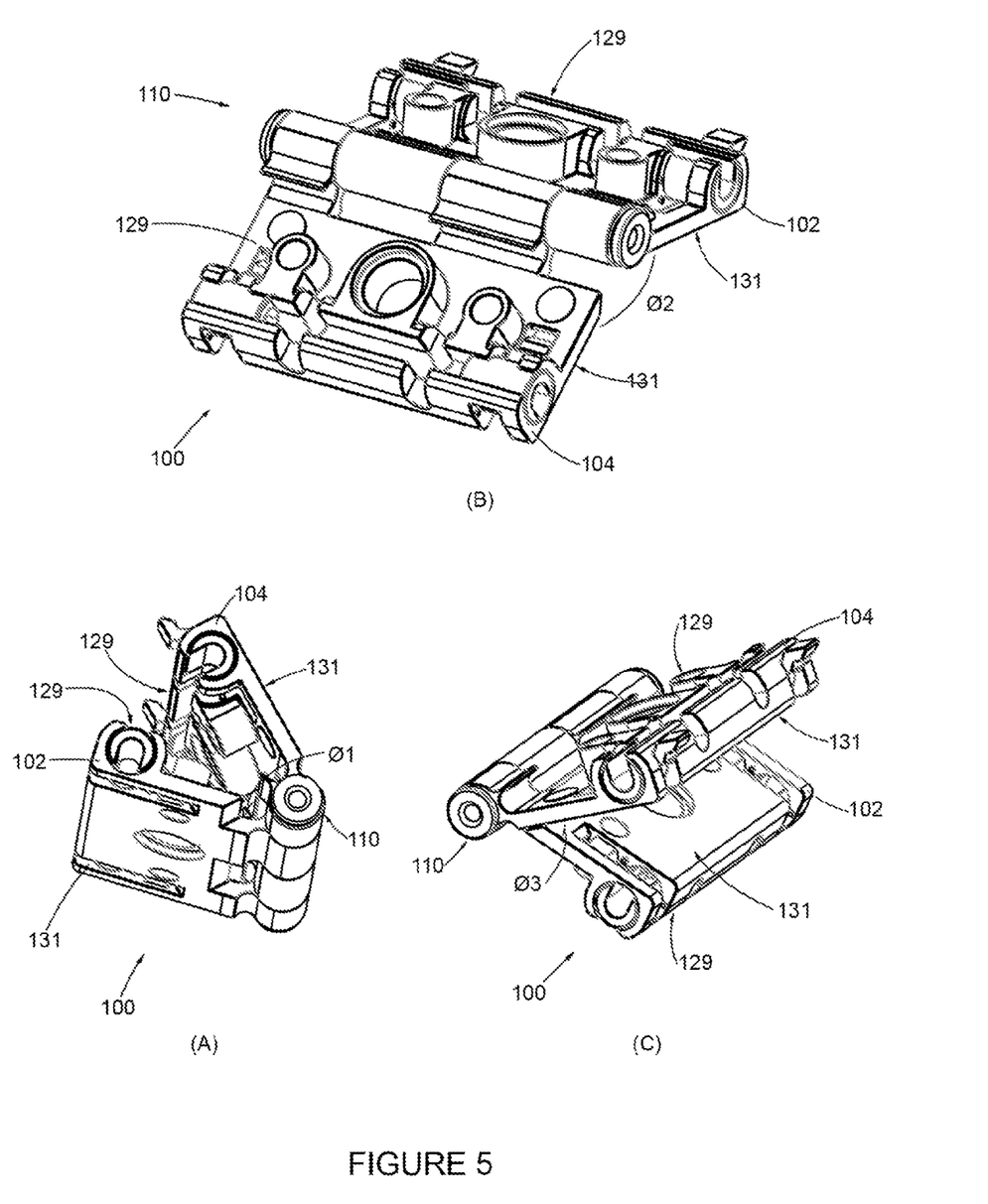
FIG. 5 provides various angled configurations into which the adjustable panel connector shown in FIG. 1 can be set.

FIG. 5 illustrates various angles that the first panel element 102 and the second panel element 104 can be angled about the axis X-X. As shown in FIG. 5(A), the base structures 129 of the first panel element 102 and the second panel element 104 can be brought to an angle $ø_1$ of around 20 degrees apart, or could be fixed at a wider angle $ø_2$ between the front faces 131 of the first panel element 102 (FIG. 5(B)) and the second panel element 104 of about 140 degrees, or can be angled with an angle $ø_3$ between the front faces 131 of the first panel element 102 and the second panel element 104 of about 20 degrees (FIG. 5(C)).

The first panel element 102 and the second panel element 104 include a number of fastening arrangements for attachment of the adjustable panel connector 100 to safety panels, preferably mesh panels 105.

Figure 6:
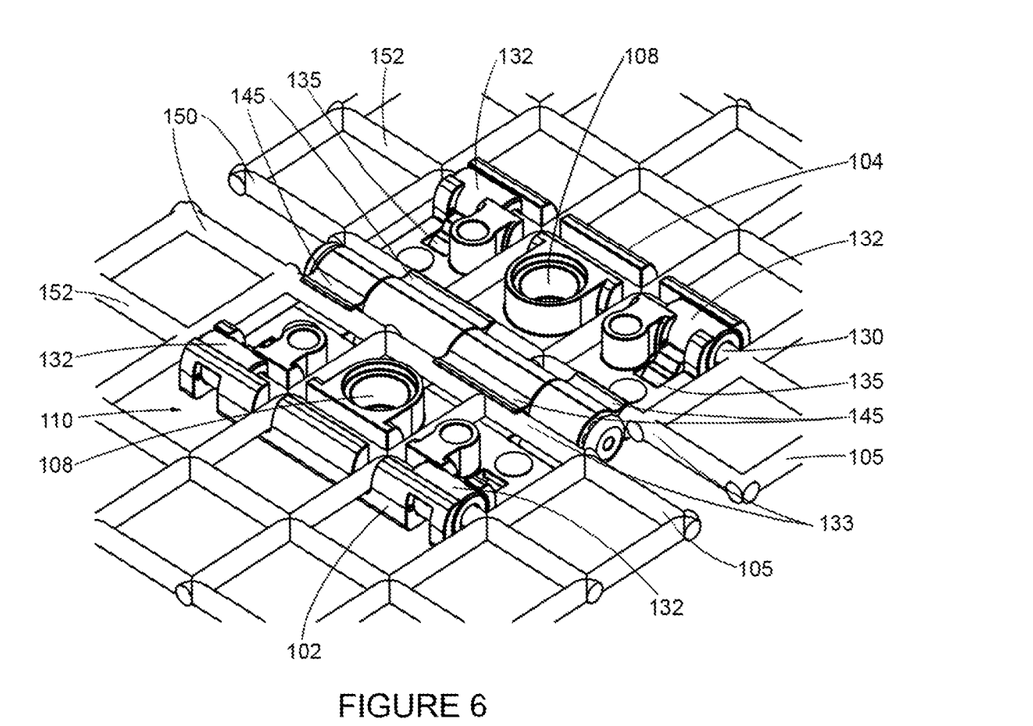
FIGS. 6 and 7 provide perspective views of the adjustable panel connector illustrated in FIG. 1 connected between two mesh panels.

The illustrated first fastening arrangements 106 comprise rotating clamps configured to releasably hold selected cross-members near the edge of a mesh panel within the adjustable panel connector 100. As best shown in FIGS. 2 and 3, each first fastening arrangement 106 includes a first mesh receiving channel 130, a locking element 132 seated within the first mesh receiving channel 130, and a second mesh receiving channel 133. The first mesh receiving channel 130 and the second mesh receiving channel 133 are used to cooperatively secure the respective first panel element 102 or second panel element 104 to the selected section of mesh panel 105 (for example as shown in FIGS. 6 and 7).

Each first mesh receiving channel 130 comprises an elongate channel which extends from each side of the first panel element 102 and the second panel element 104 and interconnects the spaced apart fastening arrangements 106 thereof. Each first mesh receiving channel 130 includes an opening, through which the longitudinal cross-members of a mesh panel can be received. Each first mesh receiving channel 130 also includes two lateral grooves 140 for receiving a lateral cross-member of the section of a mesh panel 105.

The locking element 132 of each first fastening arrangement 106 comprises a generally cylindrical body which is held within the first mesh receiving channel 130. As shown in FIG. 3, the each locking element 132 can be laterally inserted and seated within the first mesh receiving channel 130. Each locking element 132 includes a locking channel 134 configured to receive a section of a cross-members a mesh panel 105 (for example as shown in FIGS. 6 and 7) and a handle 135 for manual rotational manipulation of the locking element 132 within the first mesh receiving channel 130.

Figure 7:
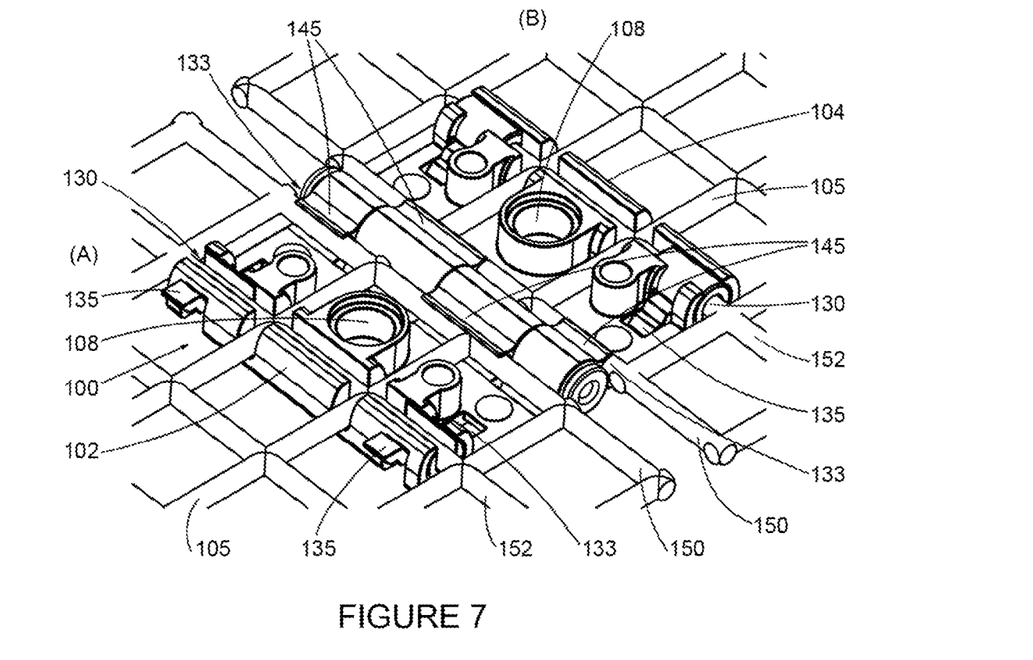

The locking element 132 is rotatably mounted within the first mesh receiving channel 130 and is movable between a receiving position (configuration (A) in FIGS. 2 and 7) in which the locking channel 134 is orientated to receive a section of a mesh panel, and a locking position (configuration (B) in FIGS. 2 and 7) in which the locking channel 134 is orientated within the first mesh receiving channel, causing the locking element 130 to engage around and/or over said section of the mesh panel and thereby fasten that section within the first mesh receiving channel 130.

Each of the connector sleeves 116 of the first panel element 102 and the second panel element 104 include a mounting flange 145 forming the second mesh receiving channel 133 between the front face of the respective first panel element 102 and second panel element 104 near the axis X-X. As shown in FIGS. 6 and 7, the mounting flange 145 and the second mesh receiving channel 133 are configured to receive and hold edge cross-members 150 of a mesh panel 105. The next set of mesh cross-members 152 of the mesh panel 105 are then received within the first mesh receiving channel 130 and locked therein as described above. This creates two spaced apart locking points on the mesh panel 105.

The spacing between the first mesh receiving channel 130 and the second mesh receiving channel 133 is configured to fit the mesh aperture size and spacing between the mesh cross-members 150 and 152 of the mesh panels 105 that the adjustable panel connector 100 is to interconnect. It should be appreciated that the size of each of the first panel element 102 and the second panel element 104 and the spacing between the first mesh receiving channel 130 and the second mesh receiving channel 133 thereof is dependent on the configuration of the mesh of the mesh panel 105 that the adjustable panel connector 100 is to interconnect.

As shown in FIGS. 6 and 7, in use, the first mesh receiving channel 130 and the second mesh receiving channel 133 of each first panel element 102 and second panel element 104 are used to cooperatively secure the respective first panel element 102 or second panel element 104 of the adjustable panel connector 100 to that mesh panel 105. In use, the adjustable panel connector 100 is firstly configured to the required angle by orientating the first panel element 102 and the second panel element 104 to a desired angle about axis X-X and then inserting the pivot locking rod 112 into the respective connector sleeves 116 of the first panel element 102 and the second panel element 104 to lock in that angle. In FIGS. 6 and 7, the angle between the first panel element 102 and the second panel element 104 has been locked into 180 degrees. The second mesh receiving channel 133 of each of the first panel element 102 and the second panel element 104 is then slotted around the respective edge cross-members 150 of two adjacent mesh panels 105. The next set of mesh cross-members 152 of the mesh panel 105 are then received within the first mesh receiving channel 130 and the locking channel 134 of the locking element 132. Here, each first fastening arrangement 106 is an open configuration, with the locking element 132 in the receiving position (as shown in configuration (A) of FIG. 7). A user then rotates the locking element 132 using the respective handle to the locking position (as shown in configuration (B) of FIG. 7 and the orientation of the locking element 132 in FIG. 6) to engage the locking element 132 around and/or over the received mesh cross-members 152. This secures that section of mesh panel 105 within the first fastening arrangement 106.

A mesh panel 105 can also be attached to the respective first panel element 102 and second panel element 104 using an eccentric joiner 162 and a cooperating stopper 210 connected to the joiner engagement aperture 108 of each of the first panel element 102 and the second panel element 104.

The illustrated joiner engagement aperture 108 comprises a central aperture formed within each of the first panel element 102 and the second panel element 104. As shown in FIGS. 2 and 3, the aperture may include reinforcing body 108A extending from the base of the respective panel element 102, 104. The joiner engagement aperture 108 is configured to receive a connection projection 206A or 206B of a cooperating joining element, for example eccentric joiner 162 illustrated in FIG. 4 or eccentric joiner 162E illustrated in FIG. 4A.

The illustrated eccentric joiner 162 or 162E and mesh stopper 210 or 210E can be used with the illustrated adjustable panel connector 100 to fasten a small portion of a mesh panel to the adjustable panel connector 100.

Figure 4:
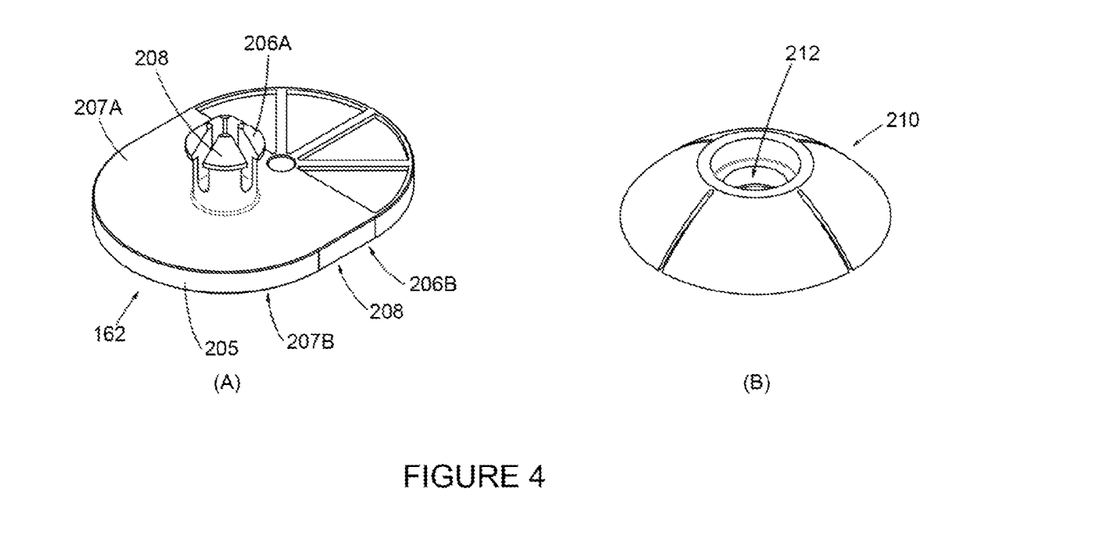
FIG. 4 provides perspective view of a first embodiment of (a) an eccentric joiner; and (b) a stopper, which can be connected with the adjustable panel connector illustrated in FIG. 1.

Firstly referring to the first embodiment illustrated in FIG. 4, the illustrated eccentric joiner 162 comprises generally oval shaped body 205 having two projections 206A and 206B extending perpendicularly from each of the broad faces 207A and 207B of that body 205. The first projection 206A and the second projection 207B extend in opposite directions from the body 205 and are generally parallel and offset (eccentrically aligned) with respect to each other.

Both the first projection 206A and the second projection 206B each include a circumferentially extending flange 208 for securement with the joiner engagement aperture 108 of the each of the first panel element 102 or the second panel element 104, or with the connection aperture 212 of the mesh stopper 210 shown in FIG. 4(b). The flanges 208 comprise one or more frustoconical portions, forming a flared, barbed head located at or near the end of the projections 206A, 206B. Each flange 208 also include a cross shaped split through its center to enable greater resilient compression of those flanges 208 when secured in or through the respective cooperative joiner engagement aperture 108 or 212 of the first panel element 102, the second panel element 104 or stopper 210 respectively. The flanges 208 enable the two parts to snap together, but inhibit subsequent separation of the two parts.

When in use, first projection 206A or the second projection 206B is inserted into the joiner engagement aperture 108 joiner engagement aperture 108 of the first panel element 102 or the second panel element 104. Circumferentially extending flange 208 is designed to extend through that joiner engagement aperture 108 and abut on and be captured at the edge of the opening of the joiner engagement aperture 108.

It should be appreciated that once one of the projections 206A or 206B is received in the joiner engagement aperture 108 of the first panel element 102 or the second panel element 104, the eccentric joiner 162 is able to rotate about that connection. The unused projection 206A/206B is then able to rotate about a circle, relative to the other projection 206B/206A to provide a degree of positional adjustability for that other projection 206B/206A. As will be described below, this provides an advantage when mounting a mesh panel 105 to the first panel element 102 or second panel element 104 of the adjustable panel connector 100, as the free projection can be positioned in alignment with a mesh aperture of the mesh panel 105.

The illustrated stopper 210 (FIG. 4(b)) is a clip button having a generally circular disc having a centrally formed connection aperture 212 which is used to attach the stopper 210 onto either the first projection 206A or the second projection 206B of the eccentric joiner 162. The illustrated stopper 210 is designed to be fixedly fastened onto the either the first projection 206A or the second projection 206B of the eccentric joiner 162, and therefore must be destroyed, for example by cutting, to be removed from that projection 206A or 206B.

Figure 8:
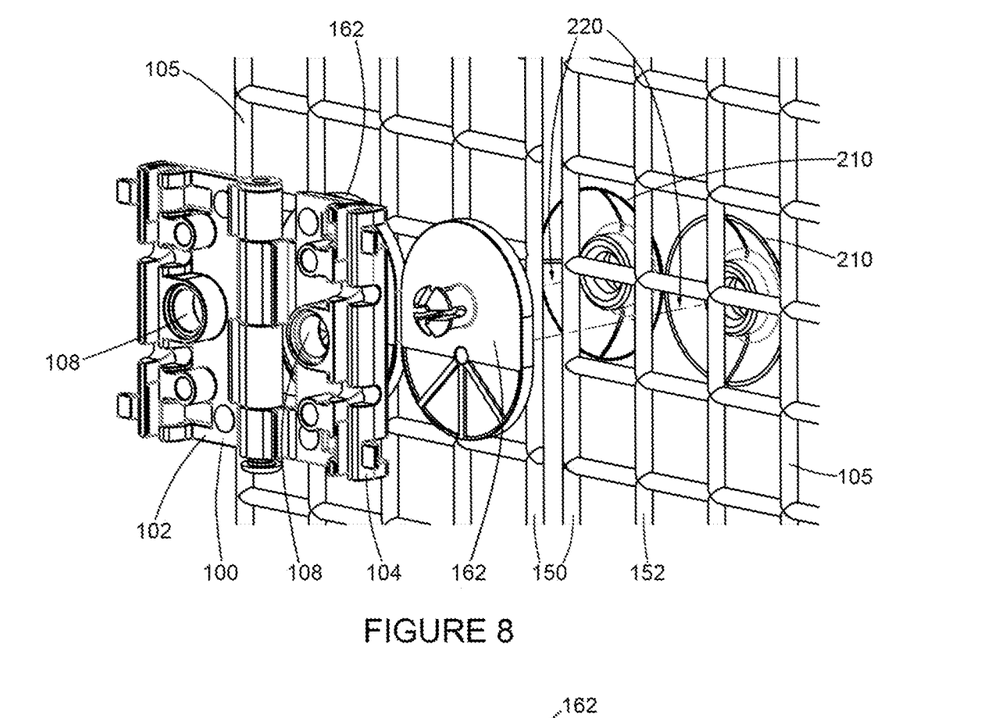
FIG. 8 provides an exploded view of the components and arrangement of the adjustable panel connector illustrated in FIG. 1 and the eccentric joiner and stopper cap of FIG. 4 when used to interconnect adjoining mesh panels.
Figure 9:
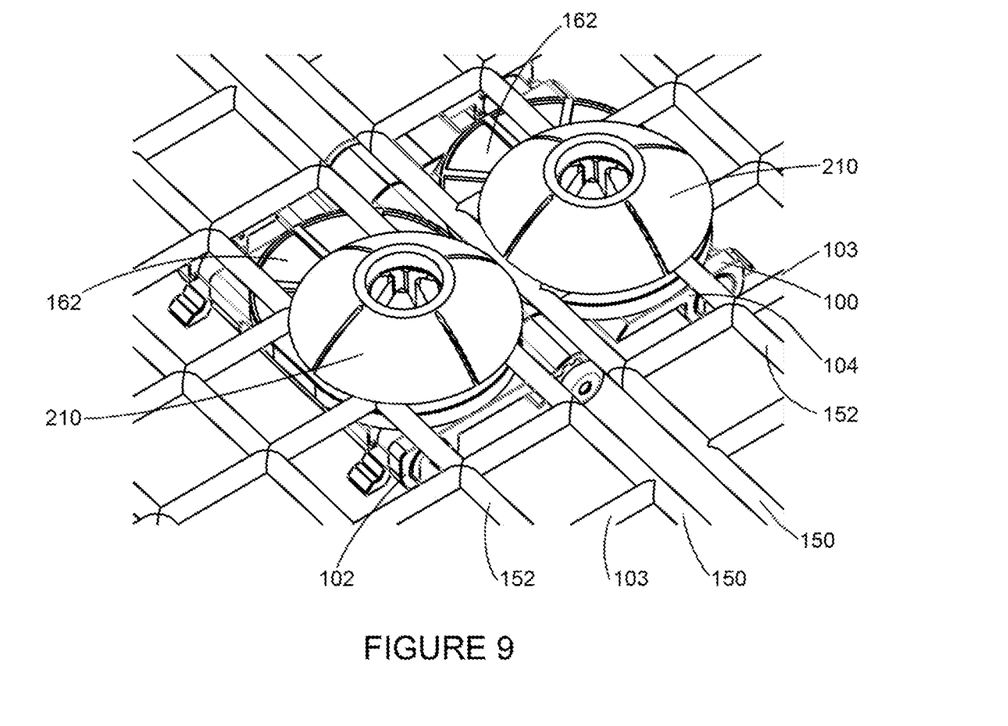
FIG. 9 provides a top perspective view of the adjustable panel connector illustrated in FIG. 1 and the eccentric joiner and stopper cap of FIG. 4 interconnecting laterally aligned adjoining mesh panels.
Figure 10:
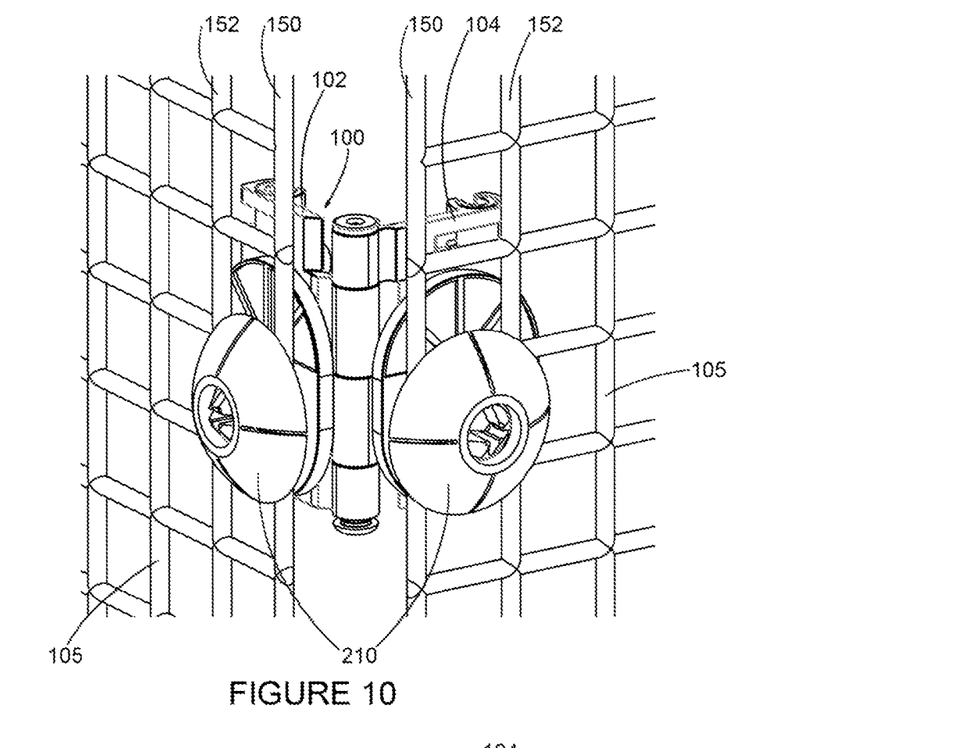
FIG. 10 provides a perspective view of the adjustable panel connector illustrated in FIG. 1 and the eccentric joiner and stopper cap of FIG. 4 interconnecting 90 degree angled adjoining mesh panels.

As shown in FIGS. 8, 9 and 10, the stopper 210 and the eccentric joiner 162 are used to sandwich and secure a portion of a mesh panel 105 between the body of the eccentric joiner 162 and the stopper 210. The stopper 210 is generally sized to be larger than the length and width of the apertures in the mesh panel 220, so that the mesh panel 105 is unable to be unintentionally removed.

Figure 4A:
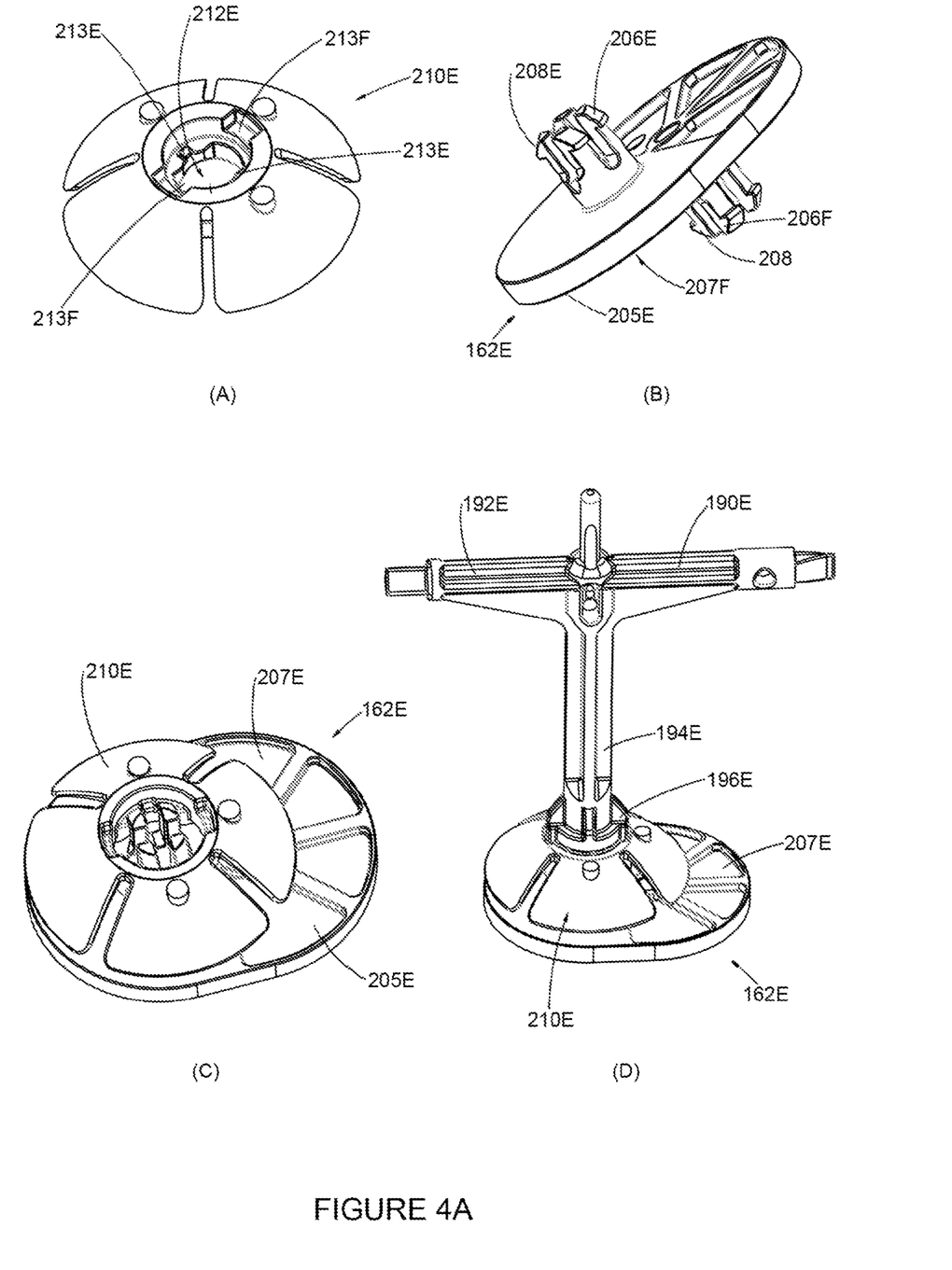
FIG. 4A provides perspective view of a second embodiment of (a) an eccentric joiner; (b) a stopper, (c) eccentric joiner with stopper attached, and (d) eccentric joiner with stopper attached with removal tool, all of which can be connected with the adjustable panel connector illustrated in FIG. 1.

The second embodiment of the eccentric joiner 162E and stopper 210 illustrated in FIG. 4A, has generally the same configuration as the eccentric joiner 162 illustrated in FIG. 4. Again, the eccentric joiner 162E comprises generally oval shaped body 205E having two projections 206E and 206F extending perpendicularly from each of the broad faces 207E and 207F of that body 205E in opposite directions and are generally parallel and offset (eccentrically aligned) with respect to each other. Both the first projection 206E and the second projection 206F each include a circumferentially extending flange 208E for securement with the joiner engagement aperture 108 of the each of the first panel element 102 or the second panel element 104, or with the connection aperture 212E of the mesh stopper 210E shown in FIG. 4A(b).

However, in this embodiment, the flanges 208E comprise directly orientated barbs only extending about 90° on each projection 206E, 206F and located on opposite sides thereof. Each flange 208E and projection 206E, 206F still include a cross shaped split through its center to enable greater resilient compression of those flanges 208E when secured in or through the respective cooperative engagement aperture 108 or 212E of the first panel element 102, the second panel element 104 or stopper 210E respectively. The flanges 208E enable the two parts to snap together, but inhibit subsequent separation of the two parts.

The illustrated stopper 210E (FIG. 4A(a)) is a clip button having a generally circular disc having a centrally formed connection aperture 212E which is used to attach the stopper 210E onto either the first projection 206E or the second projection 206F of the eccentric joiner 162E. However, in this case, the stopper 210E is designed to be releasably attached to the respective first projection 206E or the second projection 206F using a tool 190E (FIG. 4A(d)) the aperture 212E includes locking shoulders 213E configured to seat and lock the flanges 208E of the respective projection 206E, 206F in place. The aperture 212E also include release openings 213F, orientated 90° from each locking shoulder 213E, sized and configured to allow the flanges 208E of the respective projection 206E, 205F to pass through substantially unimpeded. This stopper 210E and flange 208E configuration therefore allows the stopper 210E to be more easily applied and removed through insertion and removal of the flanges 208E through the release openings 213F using locking tool 190 (FIG. 4A(d)). The locking tool 190 is a T shaped tool having three turning arms 192E, an insertion shaft 194E having a tool end 196E having a complementary configuration to the features of the aperture 212E of the stopper 210. It should be appreciated that the configuration of the locking tool 190 can differ, for example include two turning arms or four turning arms and still function as described. The locking tool 190 generally needs to be also pushed towards the stopper 210E to compress the stopper, and then the stopper 210E can be locked in place by rotation of the stopper 210E by 90° to capture the flanges 208E on the respective locking shoulders 213E, and removed by rotation of the stopper 210E by 90° to remove the flanges 208E on the respective locking shoulders 213E.

Again, the stopper 210E and the eccentric joiner 162E are used to sandwich and secure a portion of a mesh panel 105 between the body of the eccentric joiner 162E and the stopper 210E. The stopper 210E is generally sized to be larger than the length and width of the apertures in the mesh panel 220, so that the mesh panel 105 is unable to be unintentionally removed.

Referring firstly to FIGS. 8 and 9, illustrate use of the adjustable panel connector 100, two eccentric joiners 162 and two stoppers 210 to interconnect two adjacent mesh panels 105. In use, the adjustable panel connector 100 is firstly configured to the required angle by orientating the first panel element 102 and the second panel element 104 to a desired angle about axis X-X and then inserting the pivot locking rod 112 into the respective connector sleeves 116 of the first panel element 102 and the second panel element 104 to lock in that angle. In FIGS. 8 and 9, the angle between the first panel element 102 and the second panel element 104 has been locked at 180 degrees. In FIG. 10, the angle between the first panel element 102 and the second panel element 104 has been locked at 90 degrees. Each of the first eccentric joiners 162 is then snap fitted to the respective connection aperture 212 of the first panel element 102 and the second panel element 104. The second projection 206B of the eccentric joiner 162 is then aligned with and inserted through mesh apertures 220 which are proximate the edge cross-members 150 of adjacent mesh panel 220. One or both of the eccentric joiners 162 may be manually rotated if the apertures 220 on the mesh panel 105 do not line up with the second projection 206B. The eccentric nature of the eccentric joiner 162 enables the location of the second projection 206B to translate around an arc, circle or part thereof relative to (and centred about) the first projection 206A through rotation of the eccentric joiner 162 about the first projection 206A. The mesh panel 220 can be pushed into place when a suitable position is reached where the second projection 206B lines up with the apertures 220 of the mesh panel 105. The stopper 210 is snapped into engagement with the second projections 206B to sandwich the respective section of the mesh panel 105 between the respective stopper 210 and eccentric joiner 162.

In the embodiment depicted in the drawings, the stopper 210 connects to the first projection 206A on account of the flared barb like head or flanges 206C, as described above. However, it will be appreciated that the first projection 206A and stopper 210 may be connected with a set screw, grub screw or other fastener.

Figure 11:
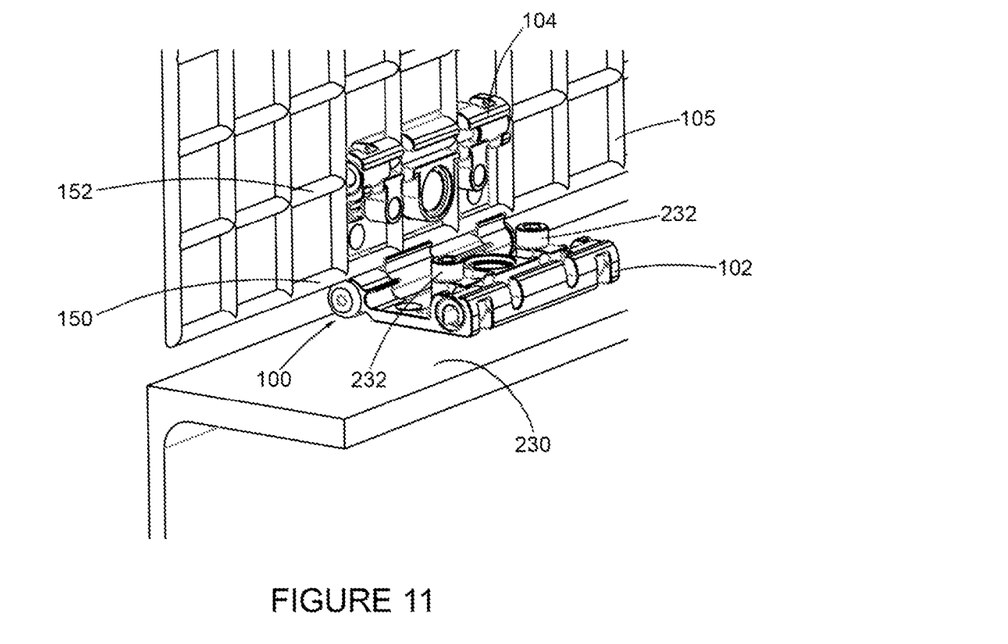
FIG. 11 provides a perspective view of the adjustable panel connector illustrated in FIG. 1 used to mount a mesh panel to a kick plate.

Each of the first panel element 102 and the second panel element 104 also include two fastening apertures 229 (FIGS. 1 to 3) used to receive a fastener such as a bolt, screw, nail, rivet or similar. As shown in FIGS. 2 and 3, each fastening aperture 229 includes strengthening body 229A formed integrally on the underside of the respective first panel element 102 and the second panel element 104. As best shown in FIG. 11, the fastening apertures 229 can be used to mount one of the first panel element 102 or the second panel element 104 to a mounting body, such as kick plate 230 by fastening that panel element, in this case the first panel element 102, to that body using a fastener, in this case bolts 232. The bolts 232 are received through the fastening apertures 229 of the first panel element 102 and fastened to the kick plate 230. The second panel element 104 can be connected to the adjacent mesh panel 105 using either the first fastening arrangement 106 (as illustrated in FIG. 11) or using an eccentric joiner 162, as described above. Again, the adjustable panel connector 100 can be configured to the required angle by orientating the first panel element 102 and the second panel element 104 to a desired angle about axis X-X and then inserting the pivot locking rod 112 into the respective connector sleeves 116 of the first panel element 102 and the second panel element 104 to lock in that angle.

FIGS. 12 to 16 illustrate a second embodiment of an adjustable panel connector 300 developed by the Applicant which can be used to interconnect mesh panels 105 that form part of a barricade, guarding barricade and/or guarding system or assembly.

Figures 12, 13, 14:
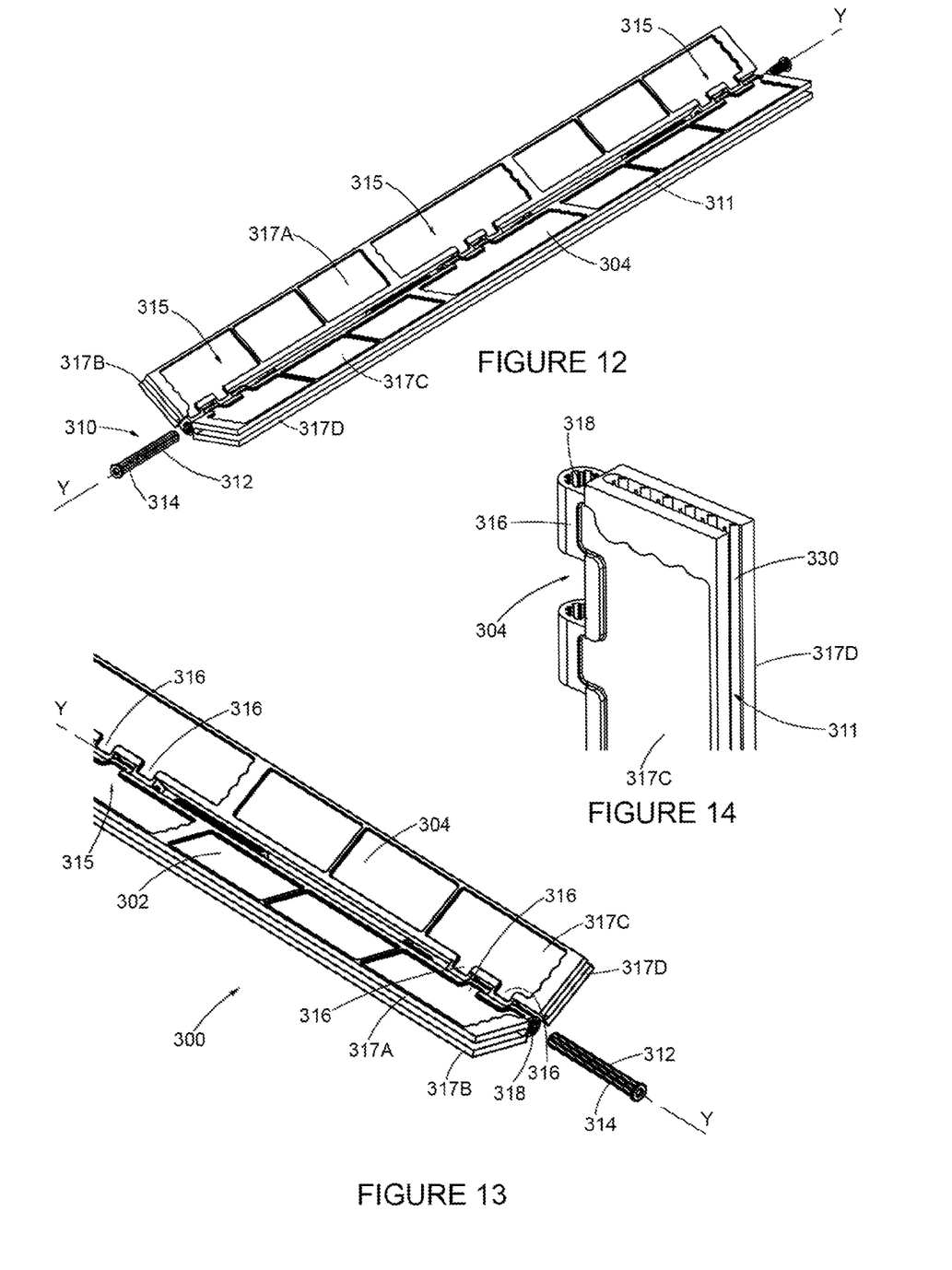
FIG. 12 is a perspective view of an adjustable panel connector according to a second embodiment.
FIG. 13 provides a more detailed perspective view of one section of the adjustable panel connector shown in FIG. 12.
FIG. 14 provides a more detailed perspective view of one section of the adjustable panel connector shown in FIG. 12.

The illustrated adjustable panel connector 300 generally comprises a first elongate rectangular panel element 302 and a second elongate rectangular panel element 304 interconnected along and about a connection axis Y-Y. The first panel element 102 and the second panel element 104 are interconnected using a connection arrangement 310 configured to lock the first panel element 102 at a selected angle relative to the second panel element 104 about the axis Y-Y.

Each of the first panel element 102 and the second panel element 104 include two cavities or channels 311 that extend in generally opposing directions relative to one another. The panel connector 300 is of an undefined length, and in which the two cavities 311 span said undefined length. The cavities 311 are formed between two spaced apart elongate members 317A, 317B, and 317C, 317D of the first elongate rectangular panel element 302 and the second elongate rectangular panel element 304.

The cavities 311 are configured to receive and capture the edges of mesh panels 105.

As illustrated in FIG. 14, in some embodiments the cavities 311 may include a series of angled teeth 330 therein, which are oriented at an angle in order to grab and secure an edge of the mesh panel 105 therein.

Figure 15:
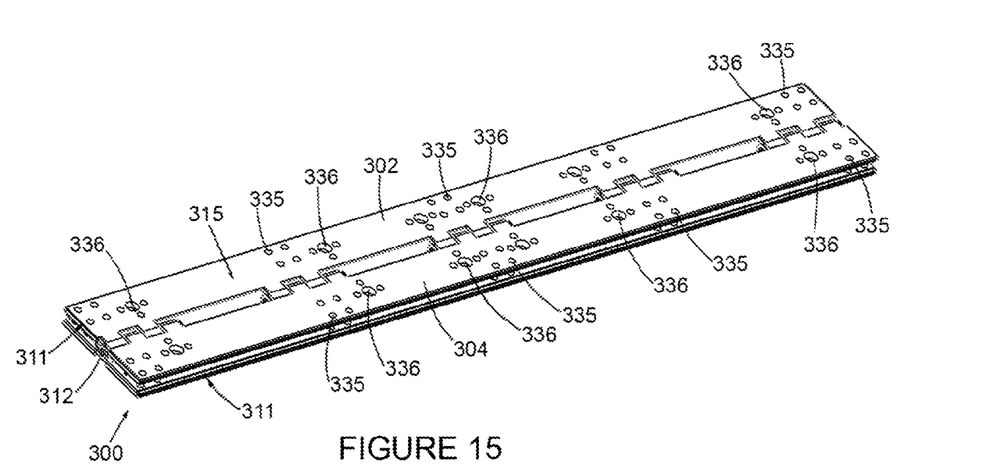
FIG. 15 is a perspective view of one alternate form of the adjustable panel connector according to a second embodiment of the present invention.
Figure 16:
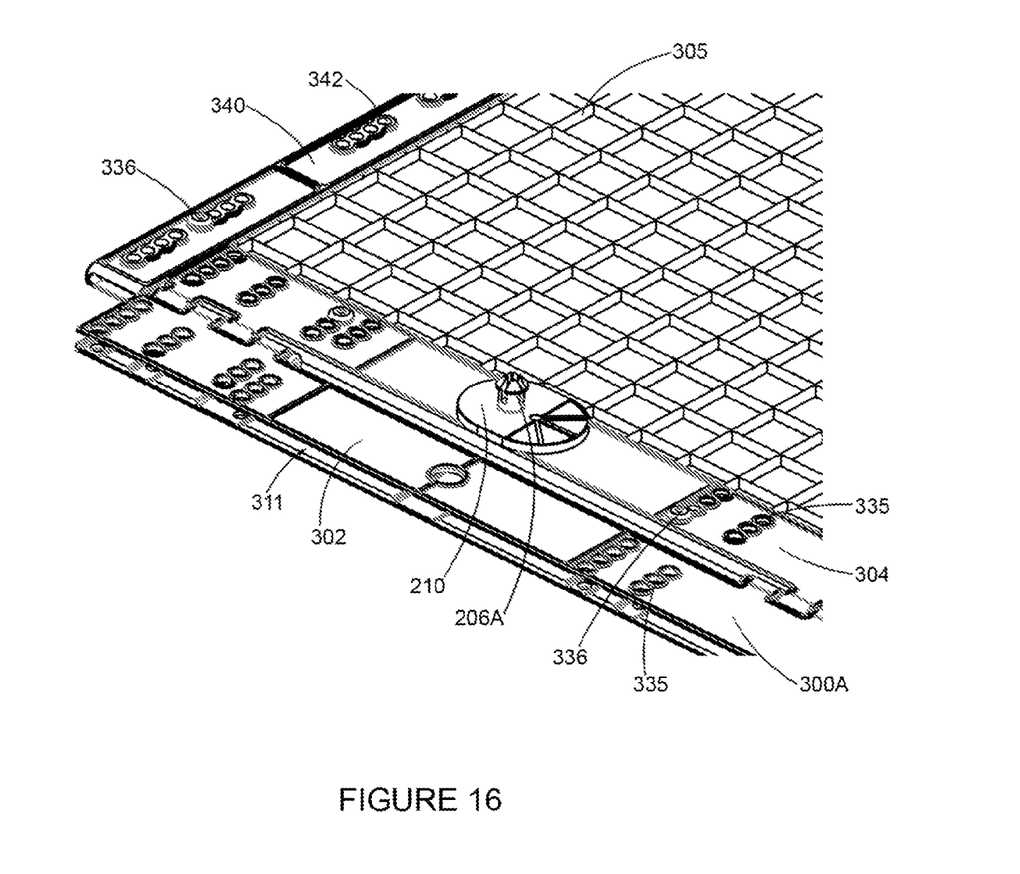
FIG. 16 is a perspective view of the adjustable panel connector shown in FIG. 15 connected with a mesh panel.

As illustrated in FIGS. 15 and 16, in other embodiments, each of the panel elements 102 and 104 may also include openings 335 (FIGS. 15 and 16) configured to receive a ribbed or ridged fastening pin 336 (FIG. 16). When an edge portion of a mesh panel 305 is received in channels 311, the fastening pin 336 can be inserted into the openings 335, through an aligned aperture of the mesh panel 105 to fasten that edge portion between the elongate members 317A, 317B, 317C and 317D of the first elongate rectangular panel element 302 and the second elongate rectangular panel element 304. In some embodiments, the fastening pin 336 can be used to compress or clamp the elongate members 317A, 317B, and 317C, 317D together. In the illustrated embodiments, the openings 335 are arranged in a V-formation to allow for the selection of the best aligned opening 335 with each respective aperture of the mesh panel 305.

The embodiment of the adjustable panel connector 300 shown in FIGS. 15 and 16 also include an aperture 336 configured to receive the first projection 206A or the second projection 207B of an illustrated eccentric joiner 162 or 162E. The eccentric joiner can be used to in conjunction with a mesh stopper 210 or 210E to fasten a small portion of a mesh panel 305 to the adjustable panel connector 100, or alternatively mount a fastening clip or clamps, for example the fastening clips or clamps described in the Applicant's international patent application PCT/AU2011/001165 to mount the mesh panel and/or adjustable panel connector 300 to a mounting point such as a rail, post or the like.

Similar to the first embodiment, the illustrated pivot connection arrangement 310 comprises a hinge assembly having a plurality of pivot locking rods 312 each of which are received in a series of connector sleeves 316 which form part of each of the first panel element 302 and the second panel element 304.

Each pivot locking rod 312 comprises an elongate connection rod including a plurality of longitudinal ribs 314 (FIG. 13) extending around the circumference of the rod. Each of the first panel element 302 and the second panel element 304 include a series of spaced apart connection sections 315 which include two spaced apart connector sleeves 316 aligned with and extending along the axis Y-Y. The pivot locking rod 312 is releasably received within a respective set of connector sleeves 316 of a connection section 315. The respective connector sleeves 316 of the connection sections 315 of the first panel element 102 and the second panel element 104 interlace about and along the axis Y-Y. Each connector sleeve 316 includes an internal channel 318 (FIG. 14) having a complementary fluted configuration to the ribbed pivot locking rod 312. This complementary shape forms an interference fit between the pivot locking rod 312 and the connector sleeves 316, when the pivot locking rod 312 is received within the connector sleeves 316. This fit prevents rotation of the connector sleeves 316 around the pivot locking rod 312, thereby locking the position of the first panel element 302 and the second panel element 304 at a fixed angle relative to the axis Y-Y.

The angle between the first panel element 302 and the second panel element 304 can therefore be adjusted to match the required angle between two adjoining mesh panels and then locked into place by inserting the pivot locking rod 312 into the respective connector sleeves 316 of each connection section 315 of the first panel element 302 and the second panel element 304.

A cap 340 (FIG. 16) may be provided that fastens over an end of the adjustable panel connector 300 and/or over the end of the mesh panel 305 so as to enclose the side profiled openings of the cavities 311. The cap 340 may also include a series of openings 342 configured to receive a ribbed or ridged fastening pin 336 for securement to the end of the adjustable panel connector 300 or through an aperture of the mesh panel 305. Again, the openings 342 may be arranged in a V-formation to allow for the selection of the best aligned opening 342 with each respective aperture of the mesh panel 305. However, it should be appreciated that the arrangement of openings 342 could have any suitable, for example, circular, T-shaped, U-shaped, X-shaped, Y-shaped or the like.

It should be appreciated that the illustrated adjustable panel connector 100 can be used as part of guarding systems on conveyors, actuators, rotating machinery and many more applications. The adjustable panel connector 100 can also be used as part of barricading systems on platforms, stairways, stair risers, scaffolding and many more applications.

The illustrated adjustable panel connector 100 can form part of a safety barricade and/or guard system that includes at least one mesh panel and a plurality of mounting clips, and a mesh panel connector or connectors which include the adjustable panel connector 100. An example of a safety barricade and/or guard system that can incorporate the present the adjustable panel connector 100 as a replacement for or in conjunction with the described mesh joiner elements or connecting strips is described in the Applicant's international patent application PCT/AU2011/001165 the contents of which should be understood to be incorporated into this specification by this reference.

The adjustable panel connector 100, the eccentric joiner 162, 162E, the mesh stopper 210, 210E and components thereof are preferably manufactured using a resilient material, such as a polymer/plastic material. It should be understood that a large number of polymers may be used, a number with selected polymer additives to enhance or provide specific desired properties. In addition, colorants may be added in the process to control the colour of the final part. Useful polymers include all thermoplastics, some thermosets, and some elastomers. More preferably, the polymer comprises at least one homopolymer, copolymer, blend or alloy including polycarbonate, polyvinyl chloride, or polyacrylonitrile. In some embodiments, the polymer is an impact modified and UV stabilised polymer. Exemplary examples include impact modified polycarbonate, acrylonitrile butadiene styrene (ABS) and blends thereof with polycarbide, styrene polycarbide blends, styrene maleic anhydride (SMA) and blends thereof with polycarbide, Styrene Methyl Methacrylate (S-MMA) and blends thereof with polycarbide, Acrylonitrile Ethylene Styrene (AES) and blends thereof with polycarbide, acrylonitrile styrene acrylate (ASA) and blends thereof with polycarbide, in particular an ASA/polycarbide alloy. In an exemplary embodiment, the mesh panel is manufactured from Geloy HRA222F, Geloy HRA170D and/or UPVC.

With respect to the above description, it is to be realized that the optimum dimensional relationship for the various components of the adjustable panel connector including variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention.

The adjustable panel connector and associated barricade system can be used on platforms, stairways, stair risers, scaffolding, elevated walkways, machine guarding as well as barricading and many more applications.

The adjustable panel connector and associated barricade system is preferably non heat conductive, anti-static, anti-corrosive, fire resistant, impact resistant, chemical resistant, UV Stabilised, non-conductive, and light weight.

The adjustable panel connector and associated barricade system is preferably reusable, and suits permanent or temporary installations.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. An adjustable panel connector for interconnecting two mesh panels of a barricade and/or guarding system, the adjustable panel connector comprising:
   a first body element including at least one first panel fastening arrangement;
   a second body element including at least one second panel fastening arrangement, the first body element and the second body element being interconnected along and about a connection axis; and
   a pivot locking arrangement configured to lock the first body element at a selected angle relative to the second body element about the connection axis,
   wherein at least one of the first panel fastening arrangement or second panel fastening arrangement comprises:
   a mesh receiving formation for receiving a section of a mesh panel, and
   a locking element for securing the section of mesh panel within the mesh receiving formation, the locking element being rotatable between a receiving position in which a first portion of a mesh panel is received within the locking element and a locking position in which the locking element engages around and/or over said portion of the mesh panel.

2. An adjustable panel connector according to claim 1, wherein the pivot locking arrangement comprises an elongate connection rod receivable within at least one connector element of the first body element and the second body element, the pivot locking arrangement being configured to interlock with the connector element when received therein.

3. An adjustable panel connector according to claim 2, wherein the connector element comprises at least one connector sleeve configured to receive at least a portion of the connection rod, the connection rod having an interference fit within the connector sleeve(s).

4. An adjustable panel connector according to claim 2, wherein the connection rod includes at least one longitudinal fin or rib which is received within a complementary shaped groove within each connector sleeve of the first and the second body elements.

5. An adjustable panel connector according to claim 1, wherein the locking element comprises a generally cylindrical body including an opening configured to receive said section of the mesh panel.

6. An adjustable panel connector according to claim 1, wherein the locking element includes a handle for manual rotational manipulation of the locking element.

7. An adjustable panel connector according to claim 1, wherein the mesh receiving formation includes a first mesh receiving channel which receives a first portion of said section of mesh panel, and a second mesh receiving channel which receives a second portion of said section of mesh panel, the first mesh receiving channel and the second mesh receiving channel being spaced apart.

8. An adjustable panel connector according to claim 7, wherein the locking element is rotatably mounted within at least one of the first mesh receiving channel or the second mesh receiving channel.

9. An adjustable panel connector according to claim 7, wherein the second mesh receiving channel is configured to receive an edge portion of the mesh panel.

10. An adjustable panel connector according to claim 7, wherein the second mesh receiving channel is formed at or near the connection axis.

11. An adjustable panel connector according to claim 7, wherein each of the first mesh receiving channel or the second mesh receiving channel are configured to receive a longitudinal member of said section of the mesh panel, and wherein at least one of the first mesh receiving channel or the second mesh receiving channel includes at least one lateral groove for receiving a lateral member of said section of the mesh panel.

12. An adjustable panel connector according to claim 1, wherein the first body element includes two spaced apart first panel fastening arrangements and the second body element includes two spaced apart second panel fastening arrangements.

13. An adjustable panel connector according to claim 1, wherein at least one of the first panel fastening arrangement or the second panel fastening arrangement comprise at least one longitudinally extending joiner channel adapted to receive an edge portion of a mesh panel.

14. An adjustable panel connector according to claim 13, wherein the first and/or the second body elements comprise elongate plates including two longitudinally extending members between which each longitudinally extending joiner channel is located.

15. An adjustable panel connector according to claim 14, further including at least one fastening aperture in at least one elongate plate through which a fastener can be received.

16. An adjustable panel connector according to claim 14, further including at least one fastener which extends through at least one section of the two longitudinally extending members.

17. An adjustable panel connector according to claim 1, wherein the first panel fastening arrangement and the second panel fastening arrangement have the same configuration.

18. An adjustable panel connector according to claim 1, wherein at least one of the first panel fastening arrangement or the second panel fastening arrangement include a joiner engagement formation for a joiner arrangement.

19. An adjustable panel connector according to claim 1, wherein each of the first body element and the second body element include at least one third panel fastening arrangement.

20. An adjustable panel connector according to claim 19, wherein at least one of the first panel fastening arrangement, the second panel fastening arrangement, or the third panel fastening arrangement includes a joiner engagement formation for a joiner arrangement.

21. An adjustable panel connector according to claim 20, wherein the joiner engagement formation includes at least a first aperture.

22. An adjustable panel connector according to claim 20 further comprising a joiner arrangement which cooperates with the joiner engagement formation, the joiner arrangement comprising:
a joiner element having a first engagement formation located on a first side, and a second engagement formation located on an opposing second side, the first engagement formation being adapted to engage the joiner engagement formation to secure the joiner element to the respective first body element or second body element of the adjustable panel connector; and
a stopper element having a third engagement formation, the third engagement formation being engageable with the second engagement formation to secure the stopper element to the joiner element,
wherein the joiner engagement formation is pivotally engaged with the first engagement formation and the second engagement formation is eccentric relative to the first engagement formation.

23. An adjustable panel connector according to claim 1, wherein each of the first body element and the second body element include at least one opening through which at least one fastener can be received.

24. An adjustable panel connector according to claim 1, wherein each of the first body element and the second body element are configured as plates.

25. A barricade and/or machine guarding system including:
at least two mesh panels, each mesh panel being arranged with at least one edge of a first mesh panel being adjacent to at least one edge of a second mesh panel;
at least one adjustable connector arrangement according to claim 1;
wherein in use, a connector is inserted between the adjacent edges of the first mesh panel and the second mesh panel to interconnect the first mesh panel and the second mesh panel about the adjacent edges.

\* \* \* \* \*